(No Model.)  2 Sheets—Sheet 1.
W. S. BOOTH.
LATHE ATTACHMENT.
No. 457,907. Patented Aug. 18, 1891.
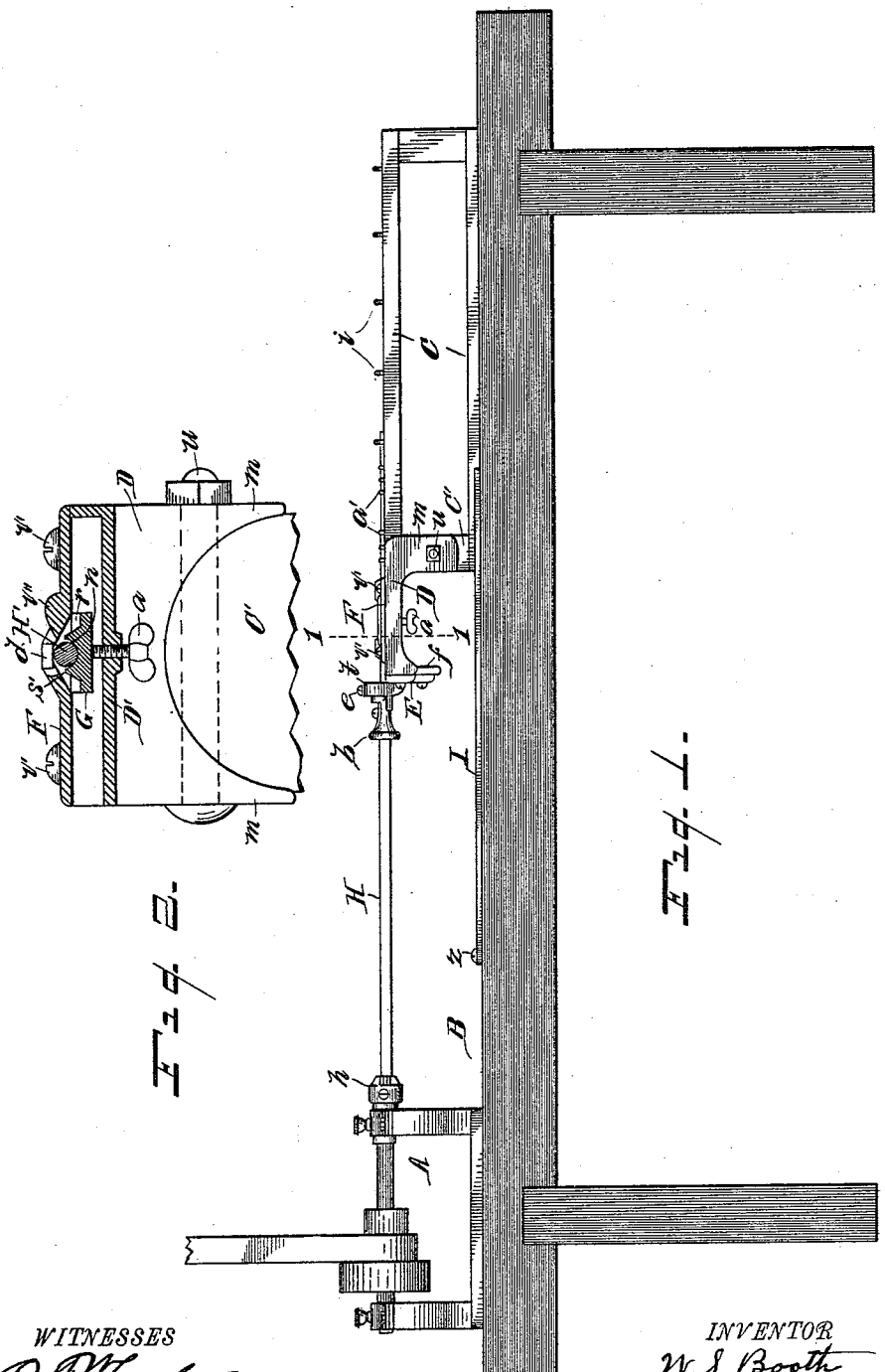
WITNESSES
INVENTOR
W. S. Booth
By
Roscoe B. Wheeler
Attorney.
THE NORRIS PETERS CO., PHOTO-LITHO., WASHINGTON, D. C.

(No Model.) 2 Sheets—Sheet 2.
W. S. BOOTH.
LATHE ATTACHMENT.
No. 457,907. Patented Aug. 18, 1891.
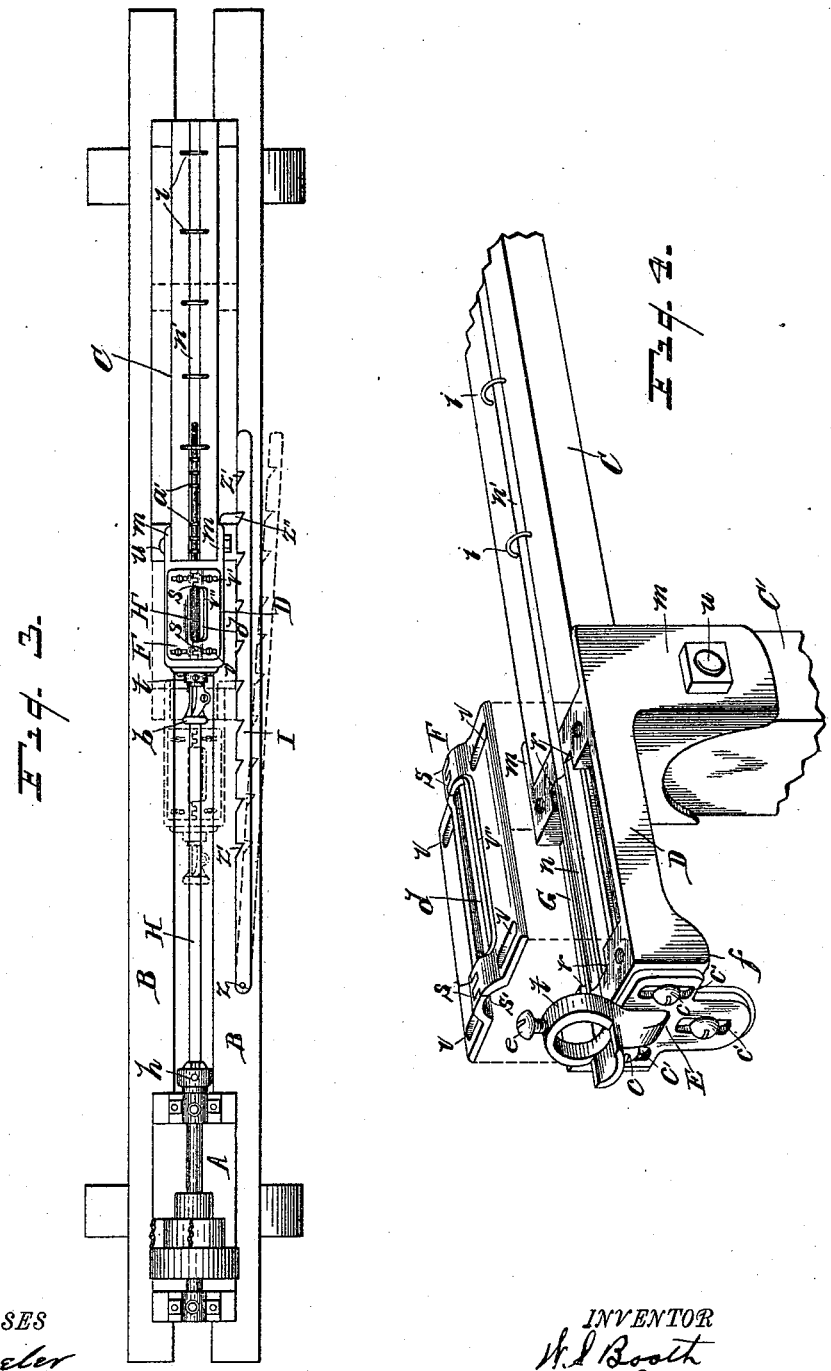
WITNESSES
INVENTOR
W. S. Booth
by
Roscoe B. Wheeler
Attorney.

UNITED STATES PATENT OFFICE.

WILLIAM S. BOOTH, OF DETROIT, MICHIGAN.

LATHE ATTACHMENT.

SPECIFICATION forming part of Letters Patent No. 457,907, dated August 18, 1891.

Application filed November 3, 1890. Serial No. 370,109. (No model.)

*To all whom it may concern:*

Be it known that I, WILLIAM S. BOOTH, a British subject, residing at Detroit, in the county of Wayne and State of Michigan, have invented certain new and useful Improvements in Lathe Attachments; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful attachments for turning-lathes especially adapted for turning wood-spindles; and it consists in a certain construction and arrangement of parts, as hereinafter more fully set forth, the essential features of which being pointed out particularly in the claims.

The object of the invention is to provide means for turning long lengths of small beaded spindles designed for ornamental wood-trimming. The difficulty heretofore encountered in the production of these spindles resulted from the incapacity to produce them except in very short lengths, making their production slow and expensive. This difficulty is overcome by the mechanism illustrated in the accompanying drawings, in which—

Figure 1 is a side elevation of a lathe provided with my improved features. Fig. 2 is an enlarged cross-section on dotted line 1 1 of Fig. 1. Fig. 3 is a plan view of Fig. 1. Fig. 4 is an enlarged detail, in perspective, of the puppet-head, the upper plate thereof being removed, showing the concaved rest that supports the turned stick or spindle.

Referring to the letters of reference, A indicates the ordinary head-stock of a wood-turning lathe; B, the bed thereof; C, a traveling-carriage mounted on said bed and adapted to move longitudinally thereon.

D indicates the puppet-head, which is secured to the forward end C' of said carriage by means of the bolt $u$ passing through the side flanges $m$ thereof, as clearly shown in Figs. 1, 2, and 4. To the vertical face of the forward end $f$ of the head D is secured the bracket E, having the annular socket $t$, (see Fig. 4,) adapted to receive the shank of the hollow cutting-head $b$, (shown in Fig. 1,) and in which said head is secured by the set-screw $e$.

H indicates the square stick from which the spindle is formed, one end of which is secured in the chuck $h$ of the lathe, by means of which it is held and revolved. The other end of the stick H is entered in the head $b$, through which said stick is adapted to pass as the carriage C is moved toward the chuck $h$, and which is provided with an internal knife, (not shown,) by means of which said revolving stick is made round.

G indicates an adjustable bearing-plate let into the upper face of the head D, the ends of which lie in the recesses $r$ in said head, as shown in Fig. 4, whereby said plate is retained in place. In the upper face of said plate G and running longitudinally thereof is a groove or concave $n$, that receives the rounded spindle H' after passing through the cutting-head $b$, as shown in Fig. 2, and which forms a bearing therefor. Said plate G is made adjustable vertically by means of the thumb-screw $a$, that passes through the under face D' of the head D, its upper end bearing against the under face of the plate G, whereby said plate may be adjusted vertically according to the various diametrical sizes of spindles turned.

Leading from the groove $n$ in the bearing-plate G and registering therewith is a groove $n'$. In the upper face of the carriage C said groove receives the turned spindle which is confined therein by the arched staples or guards $i$, set over said groove, as clearly shown in Figs. 3 and 4, by which means the revolving spindle is prevented from flying about and becoming broken.

F indicates a two-part confining-plate having the elongated central opening $d$ and the arched interlocking-fingers $s$, as clearly shown in Fig. 4, and is also provided with the transverse slots $v$, through which pass the screws $v'$, by means of which said plate is secured to the upper face of the head D, as shown in Figs. 2 and 3. The concave $s'$, in the under face of the plate F, Fig. 4, is directly over the groove $n$ in the bearing-plate G and forms the upper bearing that retains the turned spindle in place. The open space in the center of said plate F exposes the turned spindle H′, as shown in Fig. 3, at which point a tool is applied to form the beads thereon, as hereinafter set forth, and by means of the slots $v$ in said plate its two parts may be adjusted transversely to accommodate the various sizes of spindles, the interlocking-fingers $s$ of said plate permitting its two parts to be drawn apart or forced together to increase or decrease the size of the concave bearing $s'$ in its under face, as desired.

The operation of the device is as follows: The square stick H, from which the spindle is formed, is centered at one end in the chuck $h$ of the lathe. Said stick may be several feet in length, the opposite end thereof being entered in the hollow cutting-head $b$, secured to the forward end of the puppet-head D. As the stick H revolves and the carriage C is moved forward on the lathe-bed, a knife set in the head $b$ reduces said stick to a round spindle H′, which passes through said head between the plates G and F and along a groove $n'$ in the carriage C, as before described. To form the beads $a'$ on said spindle a tool or bead-turning chisel used by the operator is applied thereto through the opening $d$ in the plate F, (shown in Fig. 3,) the raised portion $v''$ on said plate (see Fig. 2) forming a rest for said tool. The plate G affords a firm bearing for the spindle to resist the pressure applied thereto during the formation of said beads, preventing the breaking of the spindle, and the plate F confines said spindle securely in place. The distance between the series of beads formed on the spindle may be regulated by the gage I, one end of which is pivoted at $z$ to the bed B of the lathe, and which is provided with a series of notches $z'$ in the inner edge thereof (see Fig. 3) adapted to engage with a stop $z''$ on the forward end of the carriage C. As the carriage is moved ahead, said gage is swung in, causing the stop $z''$ of the carriage to engage one of the notches $z'$ in said gage, whereby the carriage is arrested and held in place, permitting the formation of said beads on the spindle, where it is exposed through the opening $d$ in the plate F. After the beads have been formed the gage is swung out and the carriage moved ahead until the stop $z''$ thereon engages with the succeeding notch in the gage, as shown by dotted lines in Fig. 3, when another series of beads are formed, which operation continues until the entire length of the spindle has been turned and beaded, as will be understood.

It will be seen on looking at Fig. 4 that the bracket E, secured to the forward end $f$ of the head D and which supports the cutting-head $b$, is provided with the slots $c'$, passing therethrough, that receive the screws $c$, by means of which said bracket is secured to the head D, which construction permits of the vertical adjustment of said bracket, so as to properly center the head $b$ according to the various sizes of spindles desired.

Having thus fully set forth my invention, what I claim as new, and desire to secure by Letters Patent, is—

1. In an attachment for turning-lathes, the combination of a lathe-bed and its head-stock, a traveling carriage mounted on the lathe-bed, the puppet-head secured to said carriage, said head having the vertically-adjustable bearing-plate mounted therein, and the two-part transversely-adjustable confining-plate secured to the upper face thereof directly over said bearing-plate, said confining-plate having the central elongated opening therethrough, substantially as specified.

2. In an attachment for turning-lathes, the combination of a traveling carriage adapted to be mounted on the lathe-bed, the puppet-head secured to said carriage, said head having the vertically-adjustable bearing-plate mounted therein, and the two-part transversely-adjustable confining-plate secured to the upper face thereof directly over said bearing-plate, said confining-plate having the interlocking fingers and the central opening therethrough, and the vertically-adjustable cutting-head secured to the forward end of the puppet-head, substantially as specified.

3. In a turning-lathe attachment, the combination of a traveling carriage adapted to be mounted on the lathe-bed, the puppet-head secured thereto and having a cutting-head at the forward end thereof, said puppet-head also having mounted therein an adjustable bearing-plate provided with a concave in its upper face and the two-part adjustable confining-plate secured to the upper face thereof, the upper face of the traveling carriage provided with a continuous groove and the arched guards set over said groove, and the graduated gage pivotally secured to the bed of the lathe, substantially as specified.

In testimony whereof I affix my signature in presence of two witnesses.

WILLIAM S. BOOTH.

Witnesses:
 E. S. WHEELER,
 R. B. WHEELER.